(12) United States Patent
Nakashima

(10) Patent No.: US 6,526,270 B1
(45) Date of Patent: Feb. 25, 2003

(54) IRDA MODULATION/DEMODULATION INTEGRATED CIRCUIT DEVICE

(75) Inventor: Takayuki Nakashima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/381,634

(22) PCT Filed: Mar. 26, 1998

(86) PCT No.: PCT/JP98/01385

§ 371 (c)(1),
(2), (4) Date: Jan. 18, 2000

(87) PCT Pub. No.: WO98/44659

PCT Pub. Date: Oct. 8, 1998

(30) Foreign Application Priority Data

Mar. 28, 1997 (JP) .............................. 9-077824

(51) Int. Cl.[7] ................................. H04B 1/06
(52) U.S. Cl. ........................... 455/259; 455/85; 455/86; 455/260; 375/376; 331/60
(58) Field of Search ............................. 455/76, 85, 86, 455/257, 258, 259, 260, 41; 359/154, 162; 375/376; 331/60

(56) References Cited

U.S. PATENT DOCUMENTS 5,442,670 A * 8/1995 Shu ............................ 327/113
5,515,364 A * 5/1996 Fague ......................... 455/83

FOREIGN PATENT DOCUMENTS

| EP | 0 437 161 A2 | 7/1991 | |
| EP | 0 585 050 A2 | 3/1994 | |
| JP | 6-77823 | 3/1994 | |
| JP | 406261082 | * 9/1994 | ........... H04L/27/22 |
| JP | 8-195785 | 7/1996 | |

* cited by examiner

Primary Examiner—Lee Nguyen
(74) Attorney, Agent, or Firm—Arent Fox Kintner Plotkin & Kahn, PLLC

(57) ABSTRACT

An IrDA modulation/demodulation integrated circuit device designed for use in a portable telephone receives a clock used in a base-band integrated circuit device for processing a base-band signal, and converts the frequency of the received signal by using a PLL circuit 5 to produce a clock. This helps reduce the number of resonators incorporated in the portable telephone, and thereby reduce the cost thereof and the area of the circuit board provided therein.

6 Claims, 5 Drawing Sheets

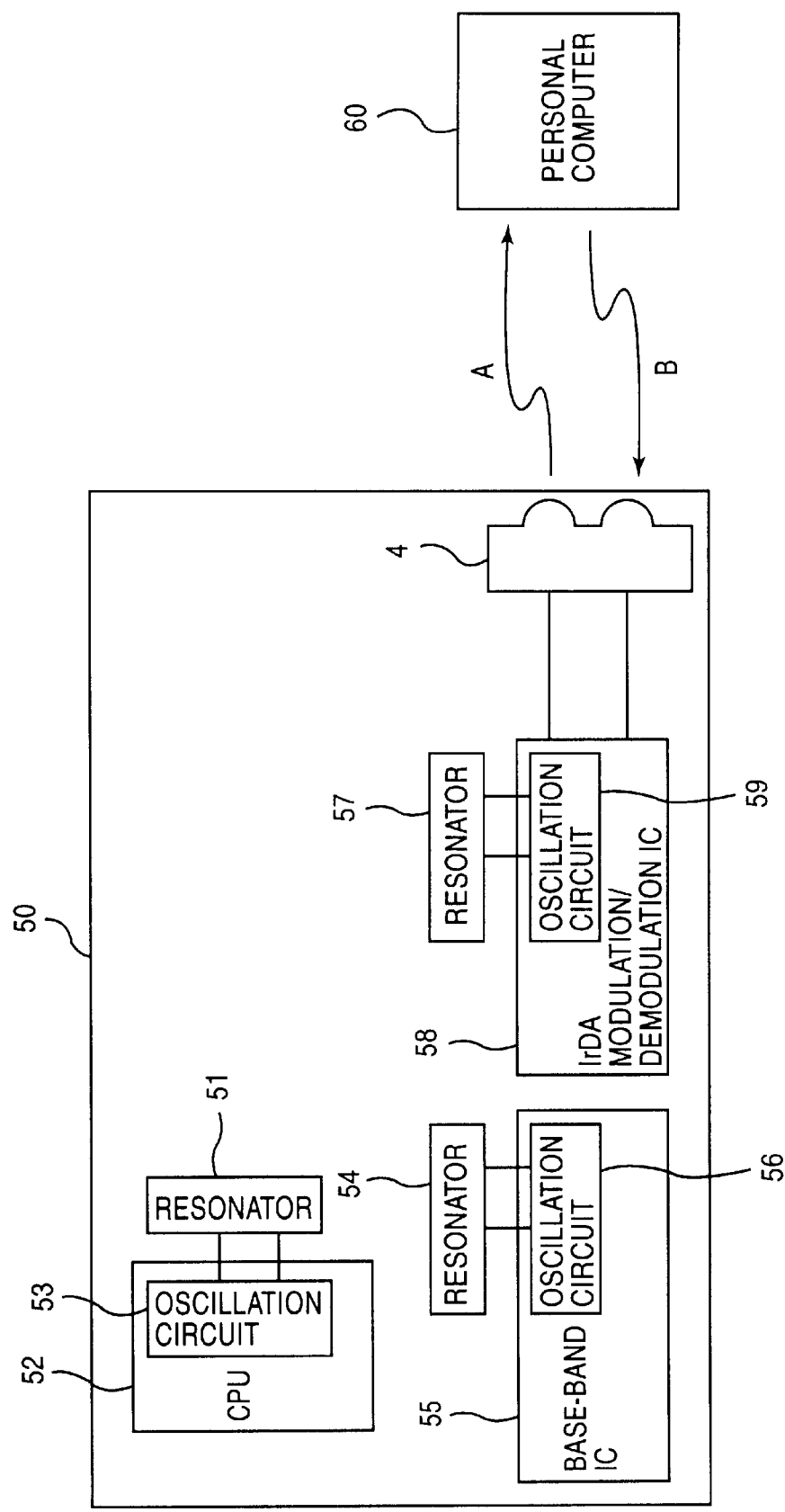

IRDA MODULATION/DEMODULATION INTEGRATED CIRCUIT DEVICE

TECHNICAL FIELD

The present invention relates to an IrDA (infrared data association) modulation/demodulation integrated circuit device as is used in a portable telephone to achieve infrared data communication.

BACKGROUND ART

A conventional IrDA modulation/demodulation integrated circuit device will be described with reference to FIG. 5. A portable telephone 50 incorporates a telephone CPU (central processing unit) 52 for controlling the entire telephone, a base-band integrated circuit device 55 for processing a base-band signal, and other components.

In addition, to achieve IrDA-complying infrared data communication with an external personal computer 60 or the like, the portable telephone 50 also incorporates an IrDA modulation/demodulation integrated circuit device 58. For example, the IrDA modulation/demodulation integrated circuit device 58 is used to transfer facsimile data stored in the personal computer 60 to the portable telephone 50 by infrared rays so as to allow the thus transferred data to be further transferred from the portable telephone 50 to a remote location by radio waves. Of course, it is also possible to perform communication simply between the portable telephone 50 and the personal computer 60.

The IrDA modulation/demodulation integrated circuit device 58 modulates a signal that is going to be transmitted by infrared rays, and feeds the modulated signal to an analog front end 4. The analog front end 4, by radiating infrared rays from a light-emitting diode or the like, transfers the signal to the personal computer 60 or the like as indicated by the arrow A. When, in return, the signal transferred from the personal computer 60 by infrared rays as indicated by the arrow B is received by a photodiode or the like provided in the analog front end 4, the analog front end 4 first performs waveform shaping on the received signal, and then feeds the signal to the IrDA modulation/demodulation integrated circuit device 58. The IrDA modulation/demodulation integrated circuit device 58 then demodulates the signal.

However, the CPU 52, the integrated circuit device 55, and the integrated circuit device 58 use clocks of different frequencies, and thus require provision of separate crystal resonators (oscillators)51, 54, and 57. Consequently, the CPU 52, the integrated circuit device 55, and the integrated circuit device 58 require provision of separate oscillation circuits 53, 56, and 59. Although not shown, the portable telephone 50 may even incorporate a further integrated circuit device that requires provision of a separate resonator of its own.

The clock originating from the resonator 54 has a frequency of, for example, 12.6 MHz, 12.8 MHz, or 14.4 MHz. This clock is used by the CPU (not shown) provided within the base-band IC 55 and others. On the other hand, the clock used in the IrDA modulation/demodulation integrated circuit device 58 has a frequency of, for example, 153.6 kHz, 3.6864 MHz, or 7.3728 MHz. These values are based on the fact that IrDA standard baud rate is 9.6 kbps, and are thus set equal to a whole number times 9.6 kHz to allow a clock having a frequency of 9.6 kHz to be produced easily by frequency division.

In this way, the CPU 52, the IC 55, and the integrated circuit device 58 use separate clocks, and thus require provision of separate resonators 51, 54, and 57. That is, incorporating the IrDA modulation/demodulation integrated circuit device 58 into the portable telephone 50 leads to an increase in the number of resonators that need to be incorporated therein. Thus, the conventional portable telephone 50 described above demands comparatively high cost, and requires a circuit board having a comparatively large area to allow provision of those resonators.

DISCLOSURE OF THE INVENTION

An object of the present invention is to provide an IrDA modulation/demodulation integrated circuit device that, by reducing the number of resonators incorporated in a portable telephone, helps reduce the cost thereof and reduce the area of the circuit board provided therein.

To achieve the above object, according to a first configuration of the present invention, an IrDA modulation/demodulation integrated circuit device designed to be incorporated in a portable telephone is provided with a PLL circuit that receives a clock used in a base-band integrated circuit device for processing a base-band signal and that converts the frequency of the received clock to produce a clock for the IrDA modulation/demodulation integrated circuit device.

According to this configuration, the IrDA modulation/demodulation integrated circuit device takes in the clock (having a frequency of, for example 12.6 MHz) used in the base-band integrated circuit device, and converts its frequency to, for example, 7.3728 MHz by using the PLL circuit. The IrDA modulation/demodulation integrated circuit device modulates or demodulates a signal by using the clock that has undergone such conversion.

According to a second configuration of the present invention, in the IrDA modulation/demodulation integrated circuit device of the first configuration described above, the PLL circuit is provided with a first frequency division circuit for dividing the frequency of the clock used in the base-band integrated circuit device by a factor of n (where n is a whole number), a phase comparator for detecting the phase difference between the output of the first frequency division circuit and the output of a second frequency division circuit, a low-pass filter for eliminating a high-frequency component from the output of the phase comparator, and a voltage-controlled oscillator whose oscillation frequency is controlled by the output of the low-pass filter. In addition, a control means is provided that divides the output of the voltage-controlled oscillator by a factor of m (where m is a whole number) by using the second frequency division circuit and that can select a specific value of n from among one or more values and a specific value of m from among one or more values.

According to this configuration, even if the frequency of the clock varies from one base-band integrated circuit device to another, it is possible to keep constant the frequency of the clock produced by the PLL circuit by selecting appropriate values of n and m by using the control means. The control means is realized, for example by controlling selectors by using control registers. In accordance with the base-band clock frequency, a selector switches signal paths in such a way as to vary the value of n in the first frequency division circuit. A similar selector is provided also on the input side of the second frequency division circuit so as to vary the value of m.

According to a third configuration of the invention, in an IrDA modulation/demodulation integrated circuit device of the second configuration described above, the control means selects values of n and m that satisfy a relation m/n=8×k/875 (where k is a whole number) when the clock of the base-band signal has a frequency of 12.6 MHz, selects values of n and m that satisfy a relation m/n=9×k/1000 when the clock of the base-band signal has a frequency of 12.8 MHz, and selects values of n and m that satisfy a relation m/n=k/125 when the clock of the base-band signal has a frequency of 14.4 MHz According to this configuration, whichever frequency, namely 12.6 MHz, 12.8 MHz, or 14.4 MHz, the clock of the base-band integrated circuit device may have, by selecting values of m and n that satisfy one of the above-noted relations, it is possible to obtain from the PLL circuit a clock having a frequency, for example 7.3728 MHz, that is equal to 115.2 kHz multiplied by k.

According to a fourth configuration of the present invention, in an IrDA modulation/demodulation integrated circuit device of the second or third configuration described above, the IrDA modulation/demodulation integrated circuit device is connected to an analog front end that emits and senses infrared rays, and the IrDA modulation/demodulation integrated circuit device starts operating by being started by a starting circuit provided therein when the analog front end senses the infrared rays.

According to this configuration, when a personal computer or the like attempts to communicate with the portable telephone by infrared rays, it first performs a discovery communication process in which it outputs a signal searching for a communication partner at regular intervals. When the analog front end senses this signal, it feeds the signal to the IrDA modulation/demodulation integrated circuit device. Designed to be able to refer to this signal, the starting circuit then starts the operation of the entire IrDA modulation/demodulation integrated circuit device. In this way, the portable telephone starts communicating with the personal computer or the like.

According to a fifth configuration of the invention, an IrDA modulation/demodulation integrated circuit device designed to be incorporated in a portable telephone is provided with a PLL circuit that receives a clock used in a base-band integrated circuit device for processing a base-band signal and that converts the frequency of the received clock, a frequency division circuit for dividing the frequency of the clock output from the PLL circuit, a reception circuit for demodulating an IrDA-complying signal fed thereto from the outside by infrared rays by using the clock output from the frequency division circuit, and a control register for changing the frequency division factor of a frequency division circuit provided within the PLL circuit when the reception circuit fails to demodulate the IrDA-complying signal.

According to this configuration, the clock produced by the PLL circuit after the entire integrated circuit device has been started is subjected to frequency division by the frequency division circuit and then fed to the reception circuit. If the reception circuit fails to perform communication at that frequency, it notifies the control register of the failure of reception. The control register is a register for setting the frequency division factor of the frequency division circuit of the PLL circuit, and, if reception fails, it changes the frequency division factor of the PLL circuit and thereby changes the clock frequency. If reception succeeds, the setting made by the control register is maintained to keep constant the frequency of the clock output from the PLL circuit; if reception fails again, the control register further changes the clock frequency.

BRIEF DESCRIPTION OF DRAWINGS

FIG. 5 is a block diagram of a portable telephone employing a conventional IrDA modulation/demodulation integrated circuit device.

BEST MODE FOR CARRYING OUT THE INVENTION

<First Embodiment>

Figure 1:
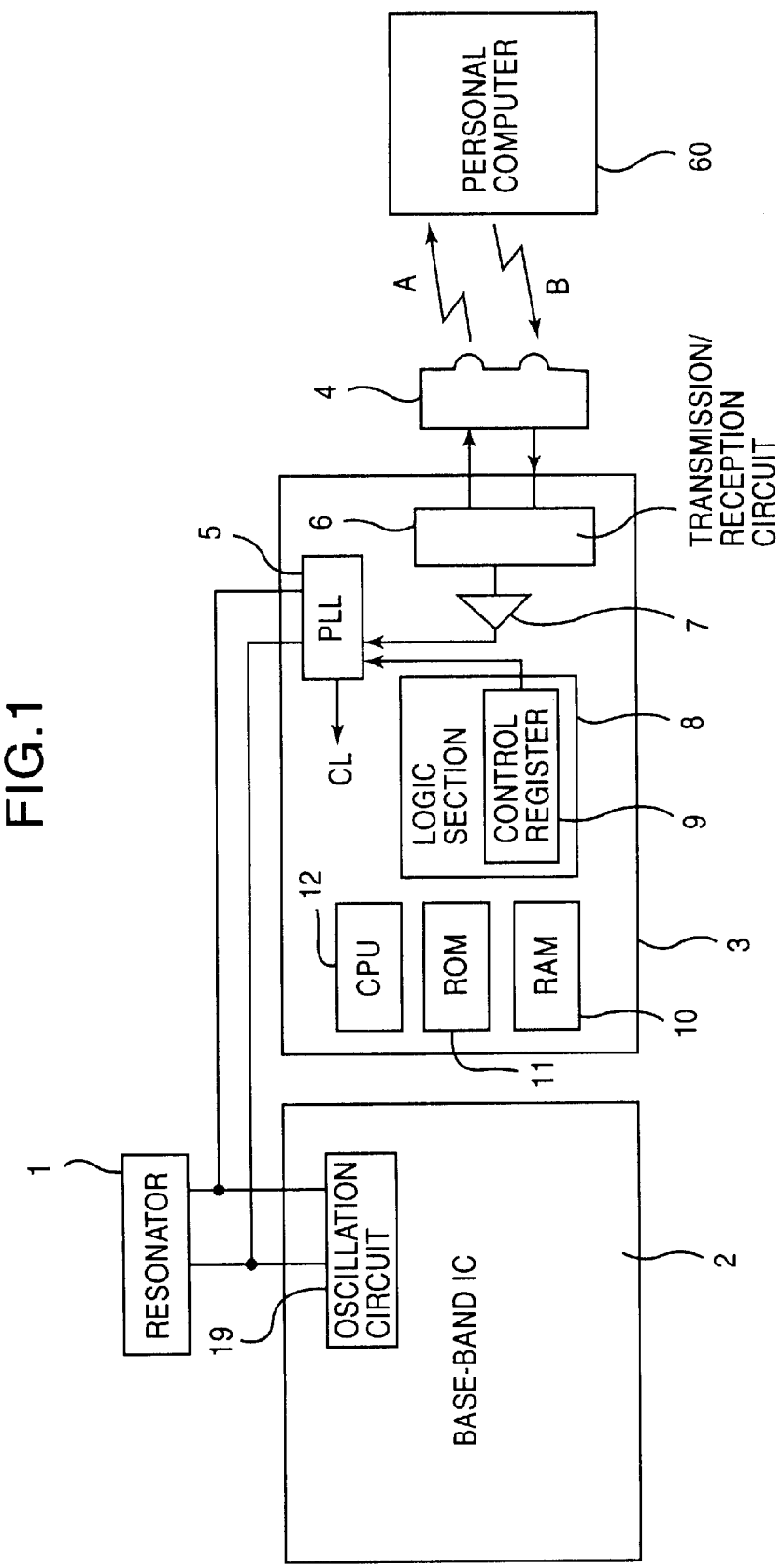
FIG. 1 is a block diagram of a first embodiment of the present invention.

A first embodiment of the present invention will be described with reference to FIGS. 1 and 2. FIG. 1 is a block diagram showing a base-band integrated circuit device 2 and an IrDA modulation/demodulation integrated circuit device 3 incorporated in a portable telephone, together with relevant components provided around them, and a computer 60 that communicates with the portable telephone. The portable telephone also incorporates a telephone CPU 52 and other components (see FIG. 5). An analog front end 4 emits and senses infrared rays. When the analog front end 4 senses infrared rays, it first performs waveform shaping on the obtained signal and then outputs it. The analog front end 4 exchanges signals with the IrDA modulation/demodulation integrated circuit device on a digital basis.

The base-band integrated circuit device 2 processes a base-band signal by performing sound encoding/decoding operations, time-division multiplex operations, and other operations. The base-band integrated circuit device 2 and the crystal resonator 1 are the same as the base-band integrated circuit device 55 and the resonator 54 incorporated in the portable telephone 50 (see FIG. 5).

The clock produced in the base-band integrated circuit device 2 by using the resonator 1 (see FIG. 1) is used to process a base-band signal, and therefore there is rather a limited choice of frequencies as its frequency.

The IrDA modulation/demodulation integrated circuit device 3 is provided with a CPU 12, a ROM (read-only memory) 11 for storing software and the like, a RAM (random-access memory) 10 used for temporary storage of data and the like, a logic section 8 composed of logic devices, a transmission/reception circuit 6 for modulating/demodulating a signal, a buffer 7 for starting the entire integrated circuit device 3 when a signal is fed from the analog front end 4 to the transmission/reception circuit 6 while the IrDA modulation/demodulation integrated circuit device 3 is off, and a PLL (phase-locked loop) 5 for producing a clock signal.

The software stored in the ROM 11 is used to perform communication parameter setting operations, signal conversion operations, and other operations in IrDA-complying data communication. This software allows the CPU 12 to perform necessary operations. Meanwhile, the RAM 10 is used for temporary storage of data and the like.

The IrDA modulation/demodulation integrated circuit device 3 takes in a clock signal from the base-band integrated circuit device 2. The IrDA modulation/demodulation integrated circuit device 3 converts the frequency of this clock by using the PLL circuit 5 so as to produce a clock CL having a frequency of, for example, 7.3728 MHz. The logic section 8 is provided with a control register 9 so that it can set the frequency division factor of the PLL circuit 5 and thereby control the frequency of the clock CL.

According to IrDA 1.0 (version 1.0), the maximum baud rate for communication is 115.2 kbps. Therefore, as long as the frequency of the clock CL output from the PLL circuit 5 is equal to a whole number times 115.2 kHz, the IrDA modulation/demodulation integrated circuit device 3 can obtain a signal that is in synchronism with the baud rate easily by performing frequency division on the clock CL.

Figure 2:
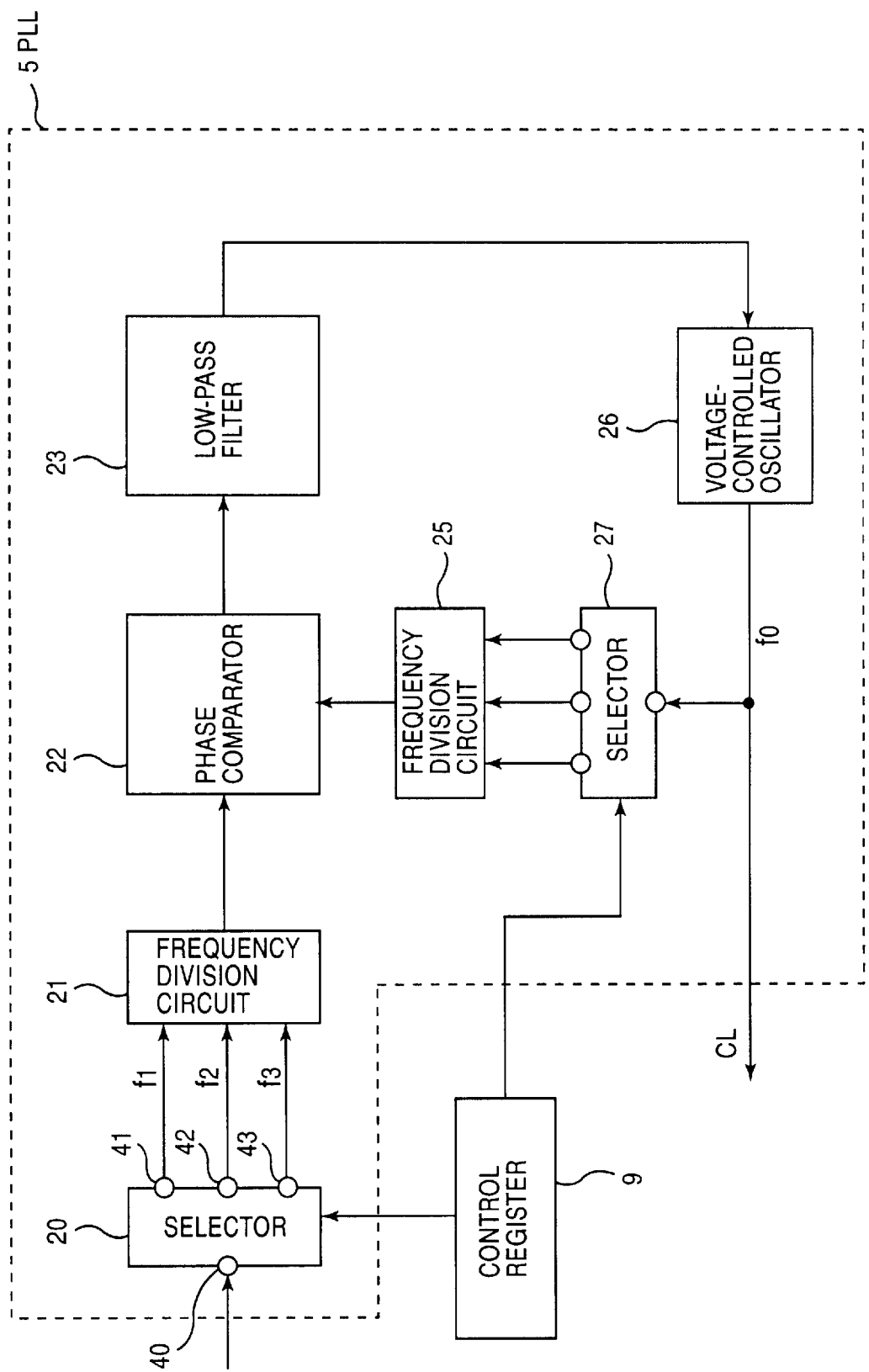
FIG. 2 is a block diagram of the PLL circuit employed in the first embodiment.

FIG. 2 is a block diagram showing in more detail the configuration of the PLL circuit 5. The clock used in the base-band integrated circuit device 2 (see FIG. 1) is fed to the PLL circuit 5, where the clock is first fed to a terminal 40 of a selector 20. In the selector 20, one of three terminals 41 to 43 is selected by the control register 9 as the destination to which to feed the clock.

For example, when the clock has a frequency of 12.6 MHz, the clock is fed to the terminal 41; when the clock has a frequency of 12.8 MHz, the clock is fed to the terminal 42; when the clock has a frequency of 14.4 MHz, the clock is fed to the terminal 43. Thus, the frequency of the clock fed out via the terminals 41 to 43 is f1=12.6 MHz, f2=12.8 MHz, and f3=14.4 MHz, respectively. Moreover, when the control register 9 switches the selector 20, it simultaneously switches also a selector 27 so that different signal paths are used in accordance with the clock frequency.

The frequency division circuit 21 provided in the stage following the selector 20 divides the frequency of the clock by a factor of n. The frequency division circuit 21 uses different values of n for the three frequencies f1 to f3. The signal that has undergone frequency division is then fed to a phase comparator 22. The phase comparator 22 detects a phase difference between the signal output from the frequency division circuit 21 and the signal output from a frequency division circuit 25. A low-pass filter 23 eliminates a high-frequency component from the output of the phase comparator 22, and feeds the resulting signal to a voltage-controlled oscillator 26.

The voltage-controlled oscillator 26 outputs the clock CL while varying the oscillation frequency fo in such a way as to decrease the above-mentioned phase difference. Moreover, the clock CL is fed, by way of one of signal paths selected by the selector 27, to the frequency division circuit 25. In the frequency division circuit 25, the frequency of the clock is divided by a factor of m (where m is a whole number), using the corresponding value of m among those set for the individual signal paths. Thereafter, the clock is fed to the phase comparator 22.

The switching of the selectors 20 and 27 is controlled by the control register 9. For example, the control register 9 selects whole numbers n and m that satisfy a relation m/n=512/875 when the clock frequency of the base-band integrated circuit device 2 is 12.6 MHz, selects whole numbers m and n that satisfy a relation m/n=72/125 when the clock frequency is 12.8 MHz, and selects whole numbers m and n that satisfy a relation m/n=64/125 when the clock frequency is 14.4 MHz.

Since there is a limited choice of frequencies as the frequency of the clock used in the base-band integrated circuit device 2, by adopting a configuration as shown in FIG. 2 that allows selection of a frequency division factor by the use of the selectors 20 and 27, it is possible to cope with many types of base-band integrated circuit device 2. However, the clock frequency used in other integrated circuit devices and the like, for example the telephone CPU 52 (see FIG. 5), is not standardized. Thus, the selectors 20 and 27 cannot cope with so many types of telephone CPU 52 or the like. In addition, there is a possibility that the clock frequency of a CPU 52 or the like will be changed to obtain better performance or the like.

In the base-band integrated circuit device 2, since there is a limited choice of frequencies as the clock frequency, simply by designing the selector 20 to cope with three frequencies, it is possible to cope with many types of base-band integrated circuit device 2. Moreover, since the base-band integrated circuit device 2 is for processing a base-band signal, it is unlikely that the clock frequency used therein is changed so often.

Back in FIG. 1, the analog front end 4 emits and senses infrared rays, and performs bi-directional data communication with, for example, the personal computer 60 as indicated by the arrows A and B. To minimize electric power consumption, the IrDA modulation/demodulation integrated circuit device 3 is kept in an off state when no infrared communication is taking place. When the portable telephone starts infrared communication with the personal computer 60, the telephone CPU 52 (see FIG. 5) starts the IrDA modulation/demodulation integrated circuit device 3 to start communication.

On the other hand, when the personal computer 60 requests the portable telephone to start communication, according to IrDA, in the discovery communication process, the personal computer 60 outputs a signal searching for a communication partner. When the analog front end 4 senses this signal, it feeds the signal to the transmission/reception circuit 6 of the IrDA modulation/demodulation integrated circuit device 3. Designed to be able to refer to this signal even if the integrated circuit device 3 is in an off state, the buffer 7 then starts the entire IrDA modulation/demodulation integrated circuit device 3.

As a result, the PLL circuit 5 starts producing the clock CL, and therefore, when the call-up signal from the personal computer 60 is sensed next time, the IrDA modulation/demodulation integrated circuit device 3 can respond to it. In this way, the portable telephone and the personal computer 60 start communicating with each other. In the discovery communication process, the personal computer 60 cannot proceed to the next communication process unless it receives a response, and therefore, even if the portable telephone takes a little while to respond to the signal from the personal computer 60, no serious problem will arise. After the IrDA modulation/demodulation integrated circuit device 3 is started, data communication is started through communication processes such as negotiation. When data communication is complete, the IrDA modulation/demodulation integrated circuit device 3 is turned off.

As described above, in this embodiment, the IrDA modulation/demodulation integrated circuit device 3 can read in the clock signal from the base-band integrated circuit device 2 and convert the frequency of the clock by using the PLL circuit 5. This eliminates the need to provide a separate resonator for the IrDA modulation/demodulation integrated circuit device 3. As a result, it is possible to reduce the number of resonators incorporated in the portable telephone, and thus reduce the cost thereof. Moreover, with less resonators, it is possible to reduce the area of the circuit board, and thus achieve miniaturization of the portable telephone as a whole. Furthermore, the IrDA modulation/demodulation integrated circuit device 3 is started automatically when infrared communication is going to be performed, and it is kept in an off state when no infrared communication is taking place. This helps minimize the electric power consumption of the portable telephone.

The selectors 20 and 27 are controlled by the control register 9; however, it is also possible to select the signal paths by securing direct connections in the selectors 20 and 27 by the use of diodes or the like in accordance with the clock frequency of the base-band integrated circuit device 2. Moreover, for the frequency division circuits 21 and 25, specific values of n and m are predetermined on a circuit basis; however, it is also possible to set the values of n and m on a software basis.

The clock CL does not necessarily have to have a frequency of 7.3728 MHz but may have a different frequency. Since the maximum baud rate according to IrDA 1.0 is 115.2 kbps, by setting the frequency of the clock CL equal to a whole number times 115.2 kHz, it is possible to obtain a clock that is in synchronism with one of the IrDA-complying baud rates easily by frequency division. Here, for the frequency division circuits 21 and 25, values of n and m, respectively, are set that satisfy relations m/n=8×k/875, m/n=9×k/1000, and m/n=k/125 (where k is a whole number), of which appropriate values are selected by the control register 9.

By increasing the number of signal paths that can be selected by the selectors 20 and 27, it is possible to increase the number of frequencies that the IrDA modulation/demodulation integrated circuit device 3 can cope with as the frequency of the clock fed thereto from the base-band integrated circuit device 2. The IrDA modulation/demodulation integrated circuit device 3 does not necessarily have to be dedicated to IrDA-complying modulation/demodulation functions but may serve other functions of the portable telephone.

<Second Embodiment>

Figure 3:
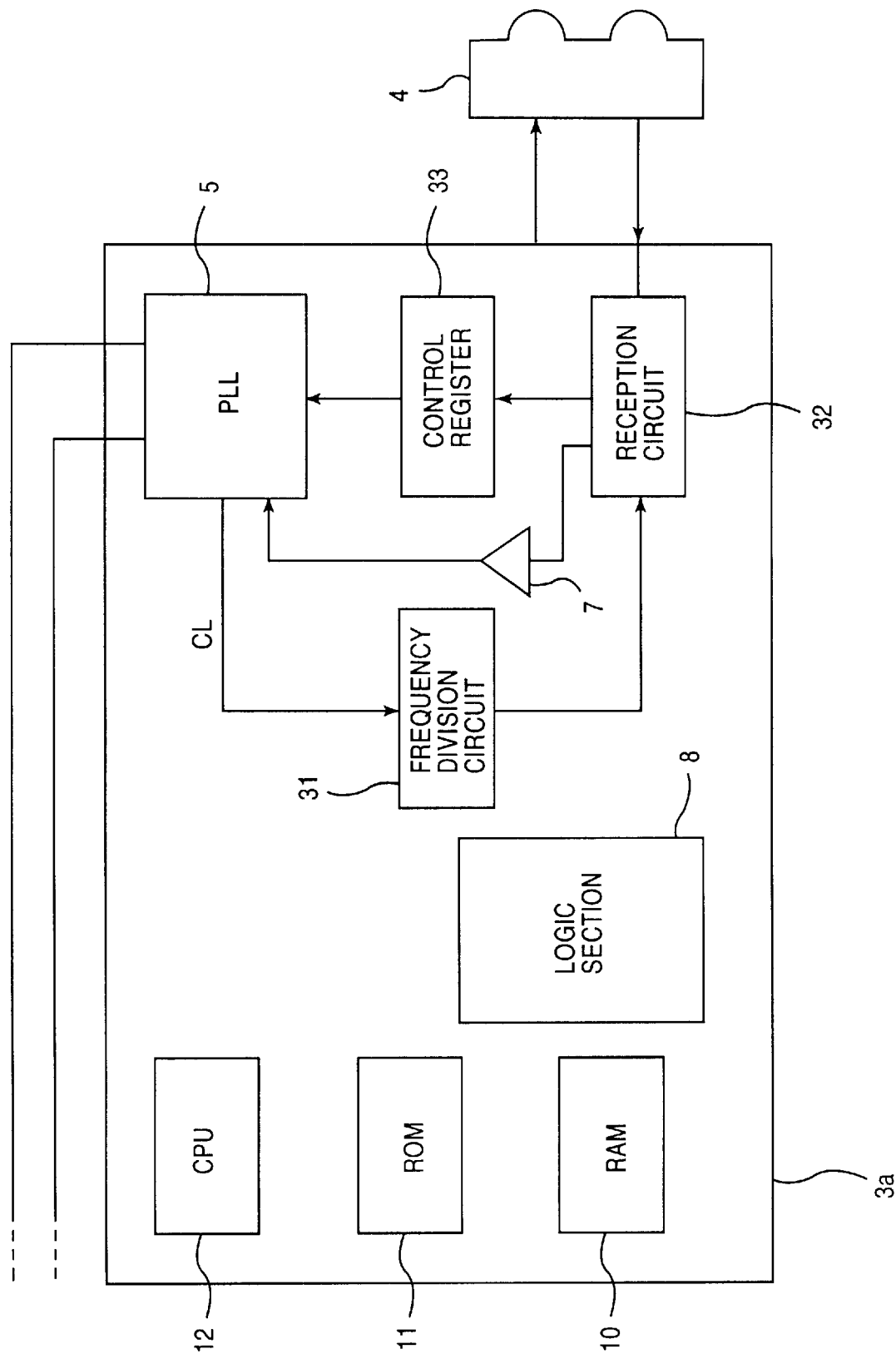
FIG. 3 is a block diagram of the transmission/reception circuit employed in the first embodiment.

A second embodiment of the present invention will be described with reference to FIG. 3. As compared with the IrDA modulation/demodulation integrated circuit device 3 (see FIG. 1) of the first embodiment described above, the IrDA modulation/demodulation integrated circuit device 3a of this embodiment is additionally provided with a function that allows selection as performed by the selectors 20 and 27 (see FIG. 2) to be performed automatically by a control register 33. A frequency division circuit 31 divides the frequency of the clock CL of the PLL circuit 5 and feeds the resulting clock to a reception circuit. In FIG. 3, such elements as are found also in FIG. 1 are identified with the same reference numerals and symbols, and overlapping descriptions will not be repeated.

As described previously, when the personal computer 60 (see FIG. 1) or the like attempts to start IrDA-complying infrared communication with the portable telephone, first, the personal computer 60 performs a discovery communication process in which it transmits, at a baud rate of 9.6 kbps, a signal for calling up the portable telephone. If no response is received from the portable telephone, the personal computer 60 cannot proceed to the next communication process.

Figure 4:
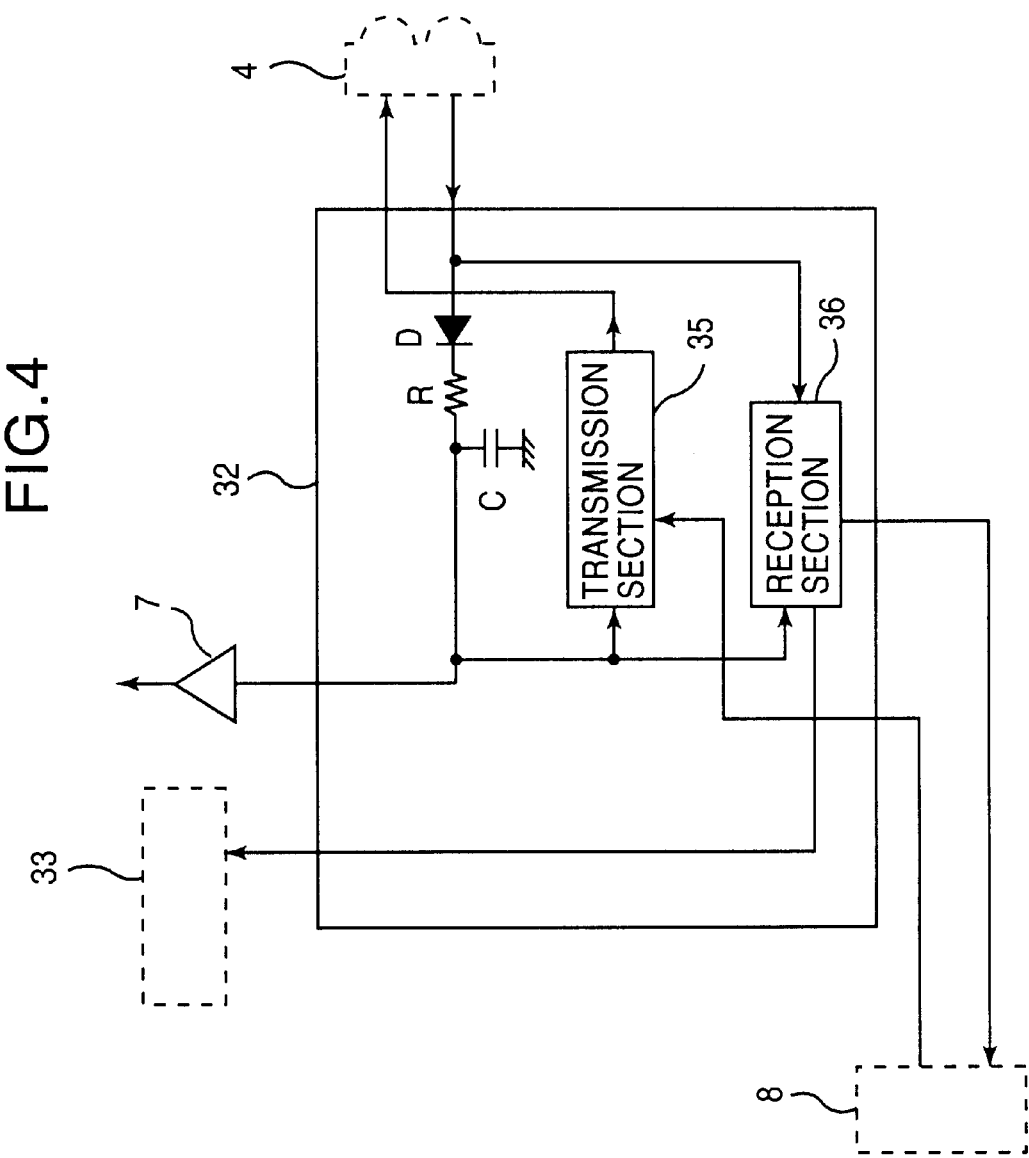
FIG. 4 is a block diagram of a second embodiment of the present invention.

FIG. 4 shows a block diagram of an example of the transmission/reception circuit 32. When the transmission/reception circuit 32 receives a signal from the analog front end 4 while it is in an off state, the signal is fed through a diode D and a resistor R to a capacitor C so as to accumulate electric charge in the capacitor C. One end of the capacitor C is grounded. When the electric charge accumulated in the capacitor C reaches a predetermined level, the buffer 7 produces an output that causes the entire integrated circuit device 3a to start operating. In addition, also within the transmission/reception circuit 32, a transmission section 35 and a reception section 36 are started by applying thereto a voltage by using switching transistors or the like.

The transmission section 35 reads in a signal from the logic section 8, performs modulation on the signal, and then feeds it to the analog front end 4. The reception section 36 demodulates the signal fed from the analog front end 4, and feeds the demodulated signal to the logic section 8. If reception fails, the reception section 36 notifies the control register 33 of the failure of reception.

In FIG. 3, when the analog front end 4 receives a signal from the personal computer 60, the transmission/reception circuit 32 feeds a signal to the buffer 7 to instruct it to start the IrDA modulation/demodulation integrated circuit device 3a. The PLL circuit 5 takes in the clock from the base-band integrated circuit device 2 (see FIG. 1), converts the frequency of the clock in accordance with the initial settings of the control register 33, and then outputs the resulting clock.

If the selection made by the control register 33 matches with the clock frequency of the base-band integrated circuit device 2, the clock CL output from the PLL circuit 5 has a frequency of, for example, 7.3728 MHz. At this time, the clock CL is subjected to frequency division by the frequency division circuit 31 to become a clock having a frequency equal to a whole number times 9.6 kHz. This clock having a frequency equal to a whole number times 9.6 kHz is fed to the reception circuit 32.

On the basis of this signal, the transmission/reception circuit 6 performs demodulation of the signal from the analog front end 4 and other operations. However, with the initial settings of the control register 33, the PLL circuit 5 does not always output a clock having a frequency of 7.3728 MHz. Accordingly, the transmission/reception circuit 6 feeds a signal indicating whether reception has been successful or not to the control register 33.

When reception succeeds, the control register 33 maintains the settings of the control register 33. By contrast, when reception fails, the control register 33 instructs the selectors 20 and 27 to make different selections. As a result, the PLL circuit 5 changes the frequency of the clock CL it produces, and reception is attempted again.

The control register 33 repeats such switching until the frequency of the clock CL becomes equal to 7.3728 MHz. If reception succeeds, the control register 33 responds to the personal computer 60 at 9.6 kbps. The control register 33 simply switches among the three signal paths by using the selectors 20 and 27 as shown in FIG. 2, and thus can start communication in response to a call-up from the personal computer 60 without undue delay.

As described above, in this embodiment, the IrDA modulation/demodulation integrated circuit device 3a can automatically cope with different frequencies of the clock of the base-band integrated circuit device 2 (see FIG. 1). Therefore, when the IrDA modulation/demodulation integrated circuit device 3a is incorporated into the portable telephone, there is no need to secure direct connections by the use of diodes or the like. As a result, regardless of the type of the base-band integrated circuit device 2, the IrDA modulation/demodulation integrated circuit device 3a can automatically produce a clock having a frequency of 7.3728 MHz. A clock CL having a different frequency is produced automatically in the same manner.

INDUSTRIAL APPLICABILITY

As described above, according to the present invention, there is no need to provide a separate resonator for an IrDA modulation/demodulation integrated circuit device, and thus it is possible to reduce the number of resonators incorporated in a portable telephone. Accordingly, it is possible to reduce the cost of the portable telephone. Moreover, it is also possible to reduce the area of the circuit board and thereby achieve miniaturization of the portable telephone.

Since there is rather a limited choice of clock frequencies as the clock frequency of a base-band integrated circuit device, by making selections in accordance with the clock frequency, it is possible to obtain a clock having a fixed frequency from a PLL circuit. Thus, to cope with different clock frequencies of the base-band integrated circuit device, there is no need to prepare different IrDA modulation/demodulation integrated circuit devices, but instead a single IrDA modulation/demodulation integrated circuit device according to claim 2 serves the purpose.

In most cases, the clock frequency of the base-band integrated circuit device is 12.6 MHz, 12.8 MHz, or 14.4 MHz. On the other hand, the maximum baud rate according to IrDA 1.0 is 115.2 kbps. Accordingly, if the PLL circuit produces a clock having a frequency equal to a whole number times 115.2 kHz, it is possible to obtain a clock that is in synchronism with one of the IrDA-complying baud rates easily by frequency division achieved by the use of the IrDA modulation/demodulation integrated circuit device. By subjecting a clock signal having a frequency of 115.2 kHz to frequency division, it is possible to produce a clock signal that is in synchronism with any one of the IrDA-complying baud rates. According to IrDA 1.1 (version 1.1), baud rates of 0.576 Mbps, 1.152 Mbps, and 4 Mbps are used; in this case, it is necessary to produce clocks having frequencies corresponding to those baud rates.

Moreover, at the start of data communication, the IrDA modulation/demodulation integrated circuit device automatically starts operating. By keeping the IrDA modulation/demodulation integrated circuit device in an off state when no communication is taking place, it is possible to reduce the electric power consumption of the portable telephone.

Moreover, it is possible to start communication by automatically switching the frequency division factor by the use of a control register in accordance with the clock of the base-band integrated circuit device. There is no need to make special settings in accordance with the type of the base-band integrated circuit device, and therefore it is easy to incorporate the IrDA modulation/demodulation integrated circuit device into a portable telephone.

Offering advantages as described above, an IrDA modulation/demodulation integrated circuit device according to the present invention is suitable for use in a portable telephone.

What is claimed is:

1. An IrDA modulation/demodulation integrated circuit device designed to be incorporated in a portable telephone,
   wherein, in the IrDA modulation/demodulation integrated circuit device, a PLL circuit is provided that receives a clock produced in a base-band integrated circuit device at an identical frequency as being used for processing a base-band signal and the PLL circuit converts the identical frequency to produce a clock for the IrDA modulation/demodulation integrated circuit device.

2. An IrDA modulation/demodulation integrated circuit device designed to be incorporated in a portable telephone,
   wherein a PLL circuit is provided that receives a clock used in a base-band integrated circuit device for processing a base-band signal and that converts a frequency of the received clock to produce a clock for the IrDA modulation/demodulation integrated circuit device,
   wherein the PLL circuit comprises:
   a first frequency division circuit for dividing the frequency of the clock used in the base-band integrated circuit device by a factor of n (where n is a whole number);
   a phase compensator for detecting a phase difference between an output of the first frequency division circuit and an output of a second frequency division circuit;
   a low-pass filter for eliminating a high-frequency component from the output of the phase comparator; and
   a voltage-controlled oscillator whose oscillation frequency is controlled by an output of the low-pass filter; and
   wherein a control means is provided that divides an output of the voltage-controlled oscillator by a factor of m (where m is a whole number) by using the second frequency division circuit and that can select a specific value of n from among one or more values and a specific value of m from among one or more values.

3. An IrDA modulation/demodulation integrated circuit device as claimed in claim 2,
   wherein the control means selects values of n and m that satisfy a relation m/n=8×k/875 (where k is a whole number) when a clock of the base-band signal has a frequency of 12.6 MHz, selects values of n and m that satisfy a relation m/n=9×k/1000 when the clock of the base-band signal has a frequency of 12.8 MHz, and selects values of n and m that satisfy a relation m/n=k/125 when the clock of the base-band signal has a frequency of 14.4 MHz.

4. An IrDA modulation/demodulation integrated circuit device as claimed in claim 2 or 3,
   wherein the IrDA modulation/demodulation integrated circuit device is connected to an analog front end that emits and senses infrared rays, and the IrDA modulation/demodulation integrated circuit device starts operating by being started by a starting circuit provided therein when the analog front end senses the infrared rays.

5. An IrDA modulation/demodulation integrated circuit device designed to be incorporated in a portable telephone, comprising:
   a PLL circuit that receives a clock produced in a base-band integrated circuit device at an identical frequency as being used for processing a base-band signal and that converts a frequency of the received clock;
   a frequency division circuit for dividing a frequency of a clock output from the PLL circuit;
   a reception circuit for demodulating an IrDA-complying signal fed thereto from outside by infrared rays by using a clock output from the frequency division circuit; and
   a control register for changing a frequency division factor of a frequency division circuit provided within the PLL circuit when the reception circuit fails to demodulate the IrDA-complying signal,
   wherein, when the reception circuit fails to demodulate the IrDA-complying signal, a signal indicating the failure is fed to the control register for changing the frequency division factor, and reception of the IrDA-complying signal is attempted again by the reception circuit.

6. An IrDA modulation/demodulation integrated circuit device designed to be incorporated in a portable telephone,
   wherein, in the IrDA modulation/demodulation integrated circuit device, a PLL circuit is provided that receives a clock signal that is produced in a base-band integrated circuit device at an identical frequency as being used for processing a base-band signal and that is equipped with selectors that can alter a frequency division ratio by selecting from among a plurality of paths a single path to frequency division circuits that are arranged with the selectors as a pair, thereby converting the received clock depending on the identical frequency to produce a clock for the IrDA modulation/demodulation integrated circuit device.

* * * * *